Figure 1:
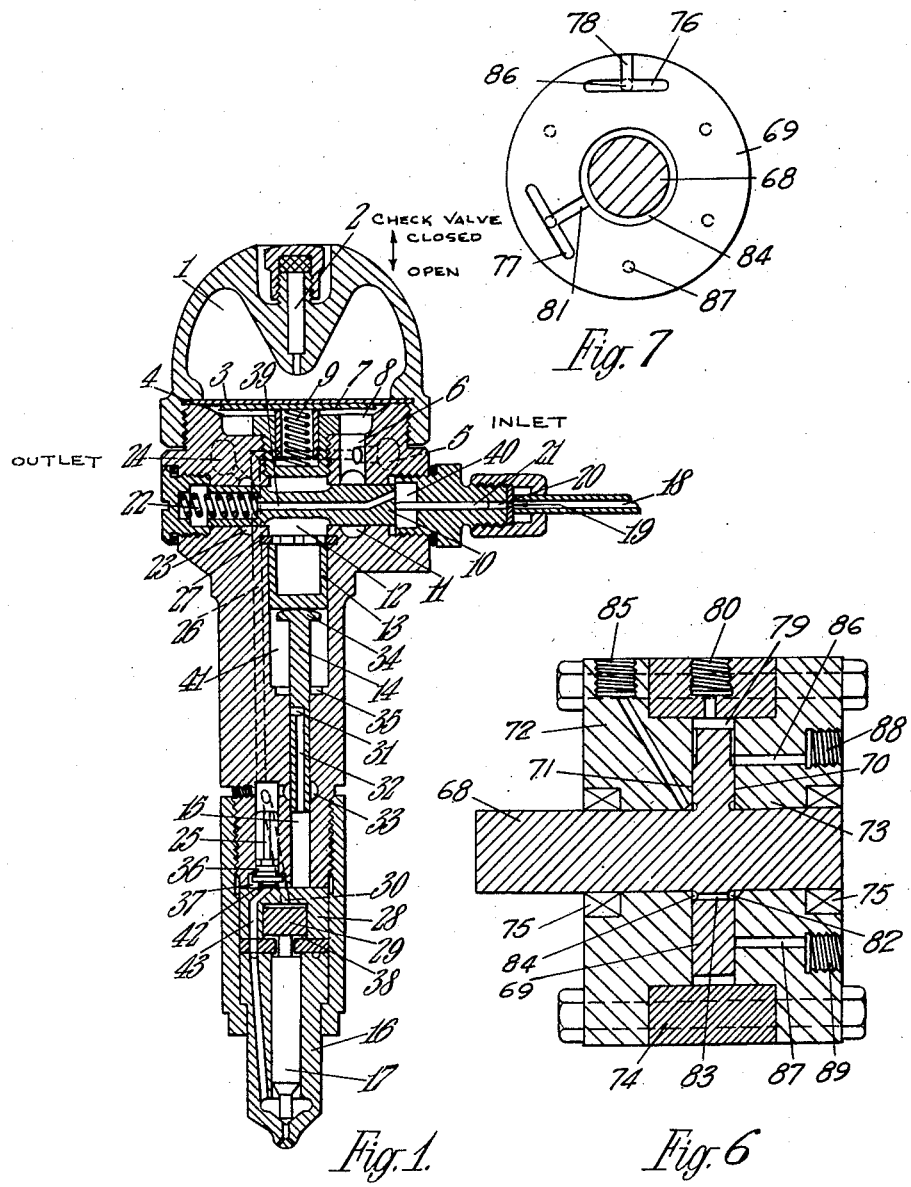

INVENTOR
W. P. Mansfield

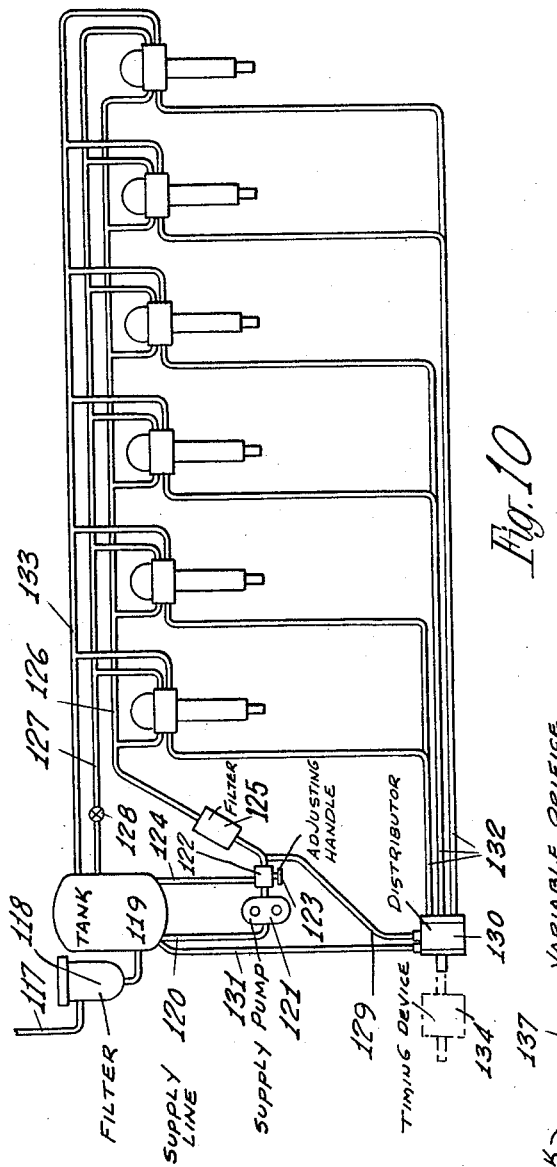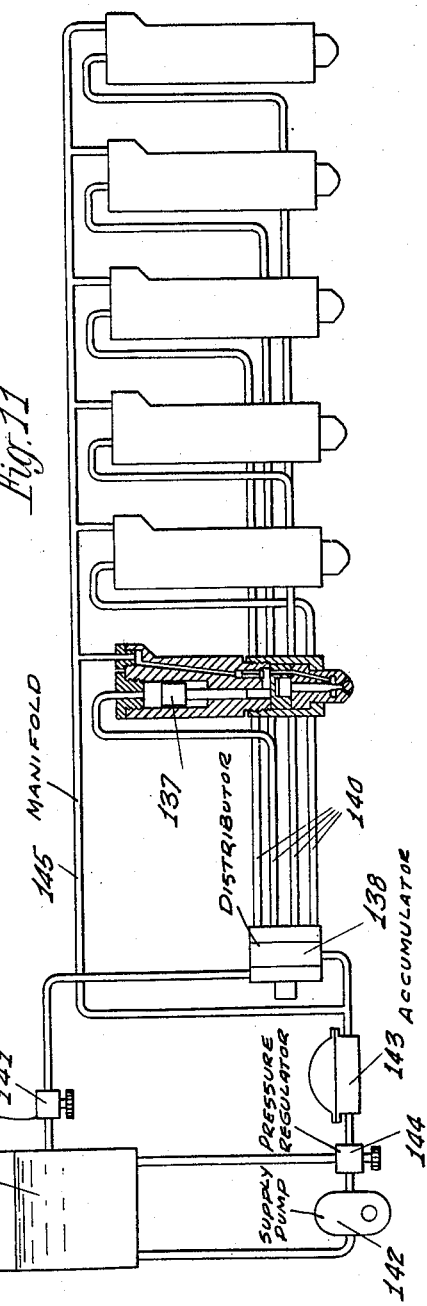

Dec. 8, 1959  W. P. MANSFIELD  2,916,028
FUEL INJECTION SYSTEMS
Filed Jan. 12, 1956  6 Sheets-Sheet 5
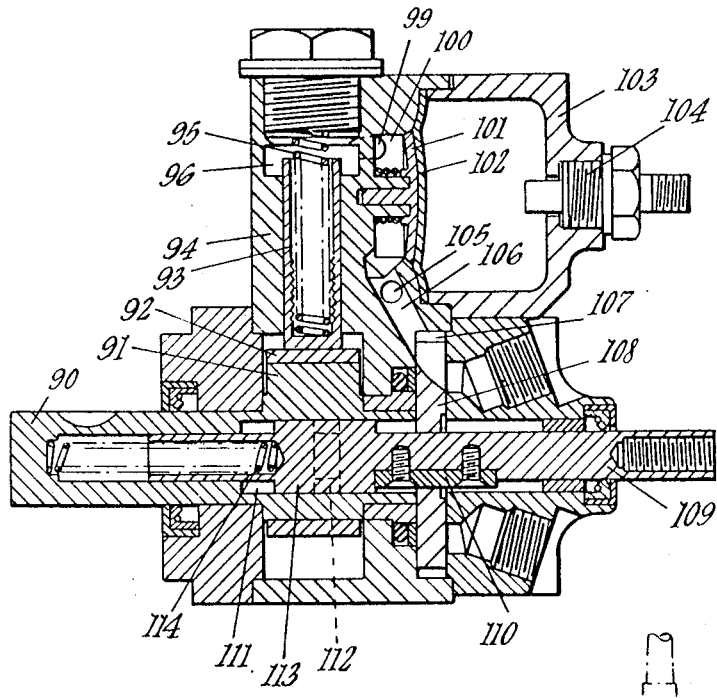
Fig. 8.
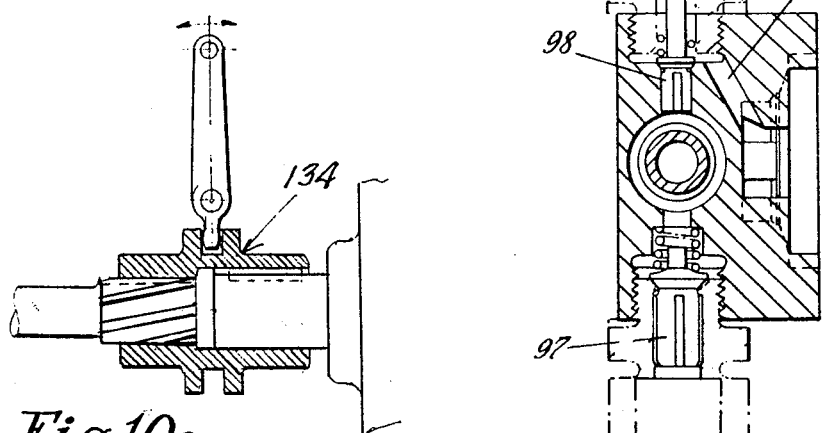
Fig. 10a.
Fig. 9.
INVENTOR
W. P. Mansfield

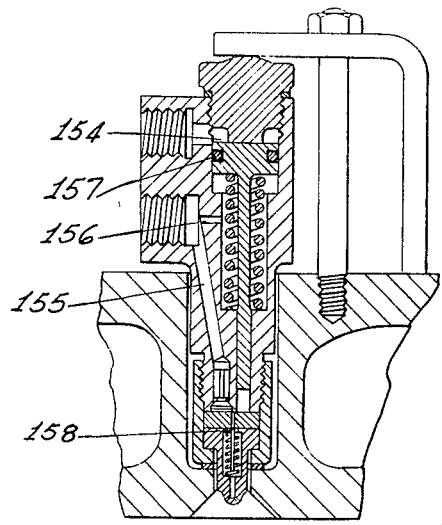
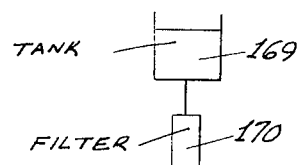
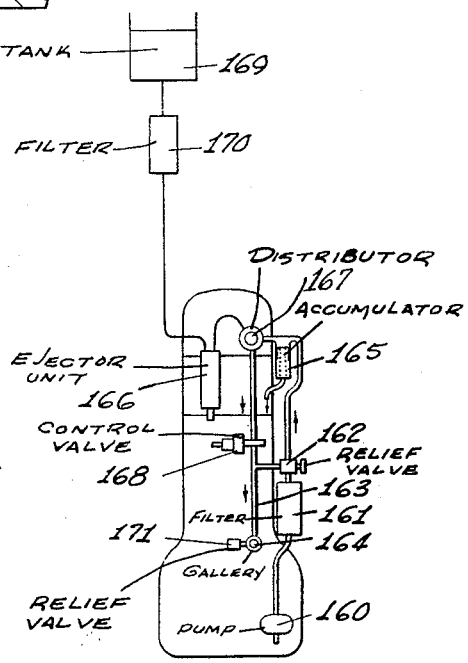
Fig. 13
Fig. 14
Fig. 15

United States Patent Office 2,916,028
Patented Dec. 8, 1959

2,916,028

FUEL INJECTION SYSTEMS

Wilfred Percival Mansfield, Slough, England, assignor to The British Internal Combustion Engine Research Association, Slough, England Application January 12, 1956, Serial No. 558,793

Claims priority, application Great Britain
January 14, 1955

9 Claims. (Cl. 123—139)

This invention relates to liquid fuel injection systems for internal combustion engines and in particular to operating and controlling means for plunger pumps.

This object of the present invention is to provide a simpler system of the above type and also to enable the necessary parts to be arranged compactly to form a combined fuel pump and injector.

The invention consists in a fuel injection system for an internal combustion engine comprising a source of pressure liquid, accumulator means for receiving said liquid under pressure from said source, liquid pressure operated piston working in a cylinder, fuel injection pump plunger, of smaller diameter than the piston, working in a bore and actuated by said piston, a passage between said accumulator and said piston cylinder, pressure liquid flow control means operated in timed sequence with the cycle of operations of the engine, and controlling flow through said passage, injector means in communication with said injection pump plunger bore, a source of fuel in communication with the said plunger bore by way of a non-return valve, and adjustable means for controlling the discharge of pressure liquid from said piston cylinder by way of said flow control means to a zone of low pressure, whereby the return stroke of the said fuel injection pump plunger, and thus the subsequent pumping stroke for the injection of fuel, is controlled solely by the rate of discharge of pressure liquid through said adjustable means.

The invention further consists in a fuel injection system for an internal combustion engine, including an injection pump plunger actuated by the pressure of a liquid, and valve means for controlling the delivery of liquid to actuate the said plunger and the release of liquid after the said plunger has completed its pumping stroke, said valve means being actuated by liquid pressure means.

The invention still further consists in a fuel injection system for an internal combustion engine, including an injection pump plunger actuated by the pressure of a liquid in which the liquid flow control means is a distributor, arranged to place the servo-cylinder of the servo-piston which actuates the pump plunger in communication with the source of pressure liquid and a zone of low pressure in timed sequence with the cycle of operations of the engine, the distributor and the pump providing the source of pressure liquid, may be arranged as a unit and be driven from the engine by a common shaft.

The invention still further consists in a system for an internal combustion engine including an injection pump plunger actuated by the pressure of a liquid, and a piston-like element operating in a bore, and arranged to apply a force to the needle valve of an injector, said piston being continuously pressed against the said needle valve to press it towards its closed position by the pressure of a liquid.

The invention still further consists in a system as set forth in any one or more of the preceding paragraphs in which the hydro-pneumatic servo operated pump and injector are combined in one unit.

The liquid, which will be termed the "servo-liquid" and which conveniently is fuel oil, is supplied to the servo-piston cylinder at a pressure which is a fraction of the maximum pressure required in the injection pipe. Thus, if the maximum injection pressure required is 8000 p.s.i., the servo-liquid pressure may be 1000 p.s.i., for example, the servo-piston area being in this case approximately eight times that of the pump plunger.

The servo-liquid is compressed and passed under pressure to an accumulator by means of a supply pump which absorbs power continuously or substantially continuously. The pump may be arranged in any convenient position, the length of the pipe leading from the supply pump to the reservoir being unimportant. It will frequently be most convenient to drive a small high-speed pump from a pinion forming part of the gear system commonly used to drive water pumps, lubricating oil pumps, and the camshaft operating the inlet and exhaust valves.

The accumulator which receives liquid from the supply pump and passes it to the individual piston cylinders is preferably of the type in which a quantity of gas at the servo-liquid pressure is trapped in a chamber separated from that through which the servo-liquid passes, by a piston or diaphragm. Compression and expansion of the gas accommodates the sudden changes in the volume of servo-liquid in the reservoir, without large changes in pressure.

The servo-liquid supply pump may be of a variable delivery type and controlled to give a small delivery when the engine is running at part load, and the injection pump plunger movement is small. By these means the power absorbed by the servo-liquid pump at part engine loads is reduced. Again, in order to minimise the power required, the amount of gas trapped in the accumulator may be limited so that the pressure falls as much as is possible without adversely affecting the injection condition.

Figure 2:
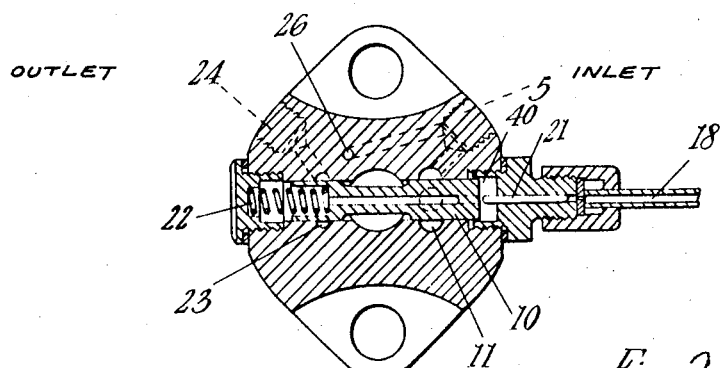
Figure 3:
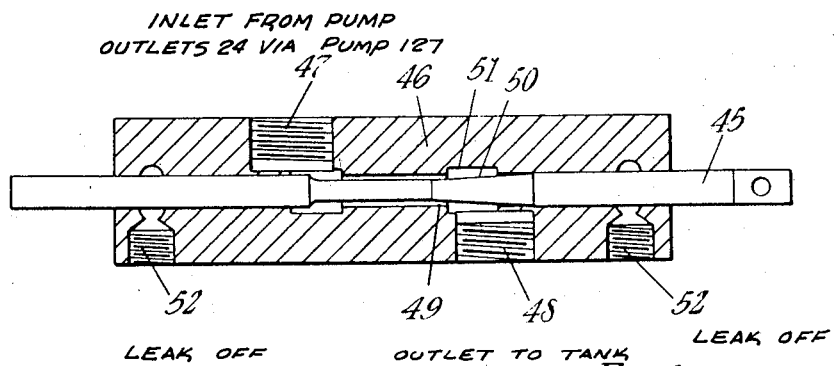
Figure 13A:
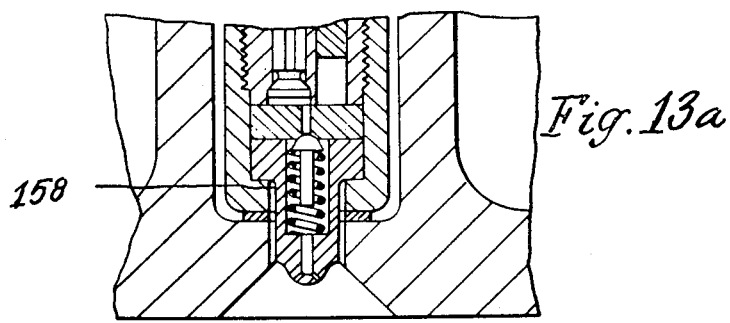
Figure 4:
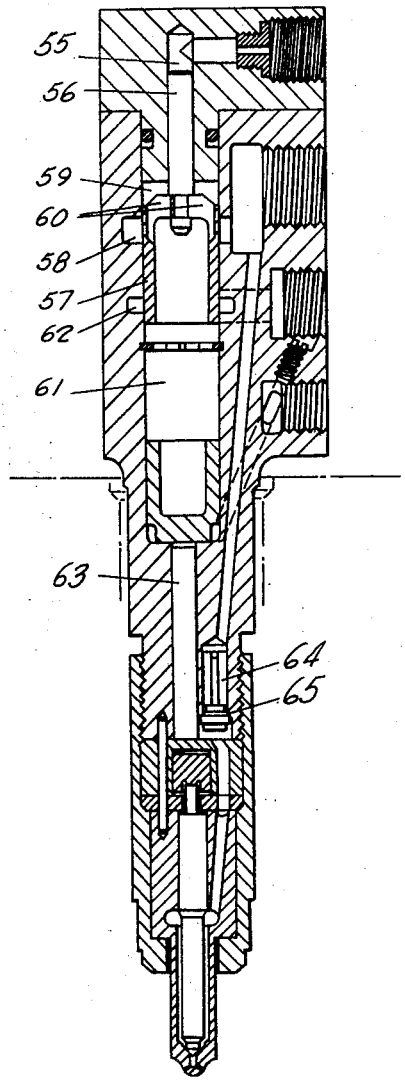
Figure 5:
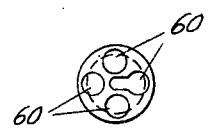
Figure 12:
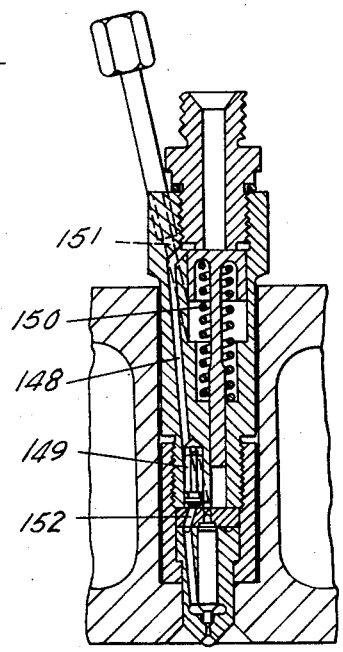

The accompanying drawings show, by way of example only, one embodiment of the invention in which:

Figure 1 is a section through a combined pump and injector unit constructed in accordance with the invention, Figure 2 is a section through the inlet and outlet connections of Figure 1, Figure 3 is a longitudinal section of adjustable liquid discharge means, Figure 4 is a section through an alternative form of construction, Figure 5 is a view showing holes in the end of the sleeve valve of Figure 4, Figures 6 and 7 show a longitudinal and transverse section respectively through a rotary valve, Figures 8 and 9 show sections of combined supply pump and distributor, Figure 10 is a diagrammatic representation of one arrangement of a system in accordance with the invention, Figure 10a is a part sectional view of the timing device of Fig. 10, Figure 11 is a diagrammatic representation of an alternative arrangement of a system in accordance with the invention, Figure 12 is a cross section through a combined pump and injector unit showing an alternative form of construction, Figure 13 is a cross section through a still further alternative form of combined pump and injector unit, Figure 13a is an enlarged view of the valve in the nozzle of Figure 13, Figures 14 and 15 show alternative systems using a unit of the type shown in Figure 13, Referring firstly to Figure 1. A chamber 1 is initially charged with gas via a conventional non-return valve 2, such as a "Schrader" tire valve and is provided with an elastic diaphragm 3 separating the gas from a space 4 into which servo-liquid, in this case fuel oil, is passed under pressure from a supply pump via the inlet connection 5 and passage 6. When the engine is at rest, the diaphragm 3 is supported by the part 7 which then rests against the annular surface 8. When the engine is running the gas pressure is balanced by the oil pressure and the spring 9 holds the part 7 open. When the axially movable control valve 10 is moved to the right, the port 11 is uncovered, and oil flows into the servo-cylinder 12, forcing down the servo-piston 13 and hence the pump plunger 14, thus pumping fuel from the bore 15 via the passage 43 to the conventional nozzle 16 controlled by the needle valve 17.

The output of the injection pump is varied by varying the stroke of the plunger 14. After the pumping stroke has been completed, bringing the lower end of the plunger 14 close to the lower end of the bore 15, so that practically no fuel is left in the bore 15, the valve 10 moves to the left uncovering the discharge port 23 allowing oil from the servo-cylinder 12 to pass to the outlet connection 24 and hence via a variable orifice 49 to a reservoir at low pressure. The pressure in the servo-cylinder 12 falls, thus reducing the force applied to the plunger, with the result that the servo-pressure opens the pump inlet valve 25 and fuel at servo-pressure flows from the passage 6 via the smaller passage 26 and past the valve 25 into the bore 15 forcing plunger 14 and piston 13 upwards. This hydraulic means of effecting the return of the plunger and piston is another feature of the invention. The distance travelled by the plunger 14 before the discharge port 23 is closed, preventing further charging of the pump chamber, is determined by the setting of the adjustable means controlling the discharge of liquid from outlet connection 24. This adjustable means, shown in Fig. 3 comprises a rod 45 sliding in a casing 46. The flow of servo-liquid between the connection 47 which receives the back flow from outlets 24 of the pump-injectors, and the connection 48 leading to the tank 119 in Fig. 10 or 139 in Fig. 11 or 169 in Figs. 14 and 15 is controlled by the variable-area orifice formed at 49 between a tapered portion 50—Fig. 2. This setting thus determines the output of the pump by controlling the length of the pumping stroke. The maximum output is limited by a stop 27 which limits the upward movement of the piston 13.

A further modification or improvement of the previous arrangement is that fuel oil is passed from a rotary distributor valve (described later) at a suitable time during the cycle, via a pipe 18 and restricting orifice 19 to a bore 10 which contains a close-fitting plunger 21 bearing on the end of the valve 10, and moving it to the left, compressing a spring 22. Later the rotary distributor valve releases the oil in the pipe 18 to a vessel at low pressure allowing the spring 22 to move valve 10 to the right at a velocity which is largely determined by the force exerted by the spring 22, and the size of the restricting orifice 19.

Figure 4 shows in place of the axially movable piston type valve in a separate bore described earlier, a sleeve valve working in an extension of the servo-cylinder and serving the same purpose of uncovering the servo-liquid supply and discharge ports at appropriate times. The two movements of the valve are effected as follows: When the pressure in the bore 55, controlled by the distributor, rises to the servo-pressure, the plunger 56 and the sleeve valve 57 to which it is connected are moved downward. As the valve approaches the end of its downward stroke, its upper edge uncovers the supply port 58. Thereafter as the servo-liquid enters the bore 59 the pressure acting on the upper end of the plunger 56 is roughly balanced by a similar pressure acting on its lower end. However the plunger continues its movement to the end of its stroke by virtue of its inertia, the force produced by the action of the entering fuel stream on the sloping end surface of the valve, which produces a downward acting force, and the downward acting force resulting from a slight pressure drop across the holes 60, (see also Figure 5) provided to allow the fuel to pass to the servo-cylinder 61. Later when the distributor causes the pressure in the plunger bore 55 to fall to a low value, the plunger 56 and the sleeve valve 57 are moved upwards by the force produced by the discharge pressure in the servo-cylinder acting on the lower end of the plunger 56. Towards the end of the upward stroke the discharge port 62 is uncovered.

The movement of the plunger 56 into the bore 59 causes a much smaller downward movement of the pump plunger 63. To prevent this from causing a preliminary injection at a low rate, if this is not desired, the non-return valve 64 is arranged so that it is moved a considerable distance before fuel can flow past it, and hence an appreciable portion of the pump stroke is utilised in closing it. In place of the cylindrical portion on the valve stem to be described later to produce this effect, a short counter-bore 65 in which the valve head is a close fit is shown in Figure 4 as an alternative.

In the arrangement of Figure 4, the ends of the sleeve valve have been used to uncover the supply and discharge ports 58 and 62.

In Figure 1 a housing 28 having a cylindrical bore is provided with a close-fitting piston 29 which bears on the needle valve 17. The small space above the piston 29 is placed in communication by the passage 30 with the passage 26 so that the pressure in the servo system acts continuously on the piston, producing a force on the needle valve 17. Instead of using a separate piston-like element to apply force to the needle valve of the injector, the fluid pressure may be applied directly to the end of the needle valve remote from the discharge orifice of the nozzle as shown in Fig. 12. In this case there is no need for a separate passage to take away fluid leaking past the loading piston and fluid leaking past the needle.

The outlet 31 of a bore 32 in the pump plunger 14 is arranged to coact towards the end of the plunger stroke with a port 33, whereby the pump action is terminated by the spilling of fuel from the bore 15 into the servo-liquid passage 26.

Shortly after this spilling action commences, a cylindrical head 34 on the plunger 14 enters a cylindrical recess 35 so that fuel oil trapped in the recess is forced out through a narrow annular clearance between the plunger head and the recess, and this dashpot action brings the assembly comprising the plunger 14 and the piston 13 smoothly to rest at the end of the stroke.

Since it can be arranged that practically no fuel is left in the bore 15 at the end of the pumping stroke, it has been found that the features referred to in the two next preceding paragraphs can both be omitted and good results still obtained. In view of its simplicity the plain plunger without passage, ports or dashpot is the preferred arrangement as shown in Figs. 4 and 12.

The fuel pump plunger 14 is slightly shorter than the bore 15 in which it works. The piston 13 is arrested at the end of its stroke by the shoulder formed between the cylinder 12 and the bore 15, and the plunger 14 by virtue of its inertia travels a short additional distance before being brought to rest as a result of the oil pressure acting on its end face. As it is free to move back this short distance, the oil pressure in the short passage between the bore 15 and the nozzle 16, falls below the closing pressure of the nozzle and causes a sharp end of injection.

A cylindrical portion 36 is provided on the inlet valve 25, whereby the first part of the stroke of the pump plunger 14 serves only to move the portion 36 into its bore until the valve 25 seats and thereafter the pressure in the bore 15 rises and discharge to the nozzle commences. This provision permits the port 11 to be opened further, and the plunger 14 to attain a higher velocity before discharge from the bore 15 to the nozzle 16 commences. Here again, however, it has been observed that even without this provision a satisfactory commencement of injection is obtained and moreover the simple valve gives the higher maximum pump output. The bore 37, in which the head of the valve 25 moves, is of diameter only slightly greater than that of the valve head. This ensures that the valve is moved back to its seat when plunger 14 commences its stroke, a valve return spring then being unnecessary. This closing movement allows a small movement of plunger 14 before the pressure in bore 15 rises.

When the valve 25 is open, a projection 42 on its head covers the opening of the passage 43 leading to the nozzle. In the event of the nozzle needle 17 sticking in the open position, this arrangement prevents the flow of oil from passage 26 under servo pressure to the nozzle holes, which would result in an excessive supply of fuel to the engine cylinder.

A passage 39 in the valve 10 allows the movement of oil from the space housing the spring 22 to the space 40 so that this oil cannot impede the movement of the valve. Oil which leaks into the spaces 38 (past the needle 17 and past the piston 29), 41 (past the pump plunger 14 and past the piston 13) and 40 (past the valve 10 and plunger 21) passes through passages not shown to a leakage oil connection adjacent to the other connections on the unit.

Various means may be used to connect the pipe 18 alternately to the servo-liquid pressure line and to a low pressure part of the system. Figures 6 and 7 show a suitable distributor arrangement.

The shaft of the rotor 68 (Figure 6) is driven by the engine at crankshaft speed in the case of a two-stroke cycle engine, or at half crankshaft speed in the case of a four-stroke cycle engine. The rotor 68 has a larger diameter portion 69, the flat end faces 70 and 71 of which are very close to the inner face of the end housings 72 and 73 which are spigoted into the bore of the central housing 74, and which form bearings for the shaft and are provided with oil seals 75. The face 70 of the rotor is provided with two main grooves 76 and 77 (Figure 7). A radial groove 78 places the groove 76 in communication with the annular space 79 (Figure 6) to which oil at servo pressure is supplied via the connection 80. A radial groove 81 places the groove 77 in communication with the annular space 82 which is connected by passage 83 to the annular space 84 which in turn is connected to a low pressure part of the system via the connection 85.

As the rotor 69 revolves, the grooves 76 and 77 move across a number of holes 86, 87 etc. (Figures 6 and 7) drilled at the appropriate radius in the end housing 73. Each hole is connected to the pipe 18 in Figure 1 of one of the combined pump and injector units via connections 88, 89 etc., thereby producing the required movements of the valve 10, Figure 1, of the units.

Matching grooves similar to 76, 77, 78 and 81, are provided in the other end face 71 of the rotor. This ensures that the forces due to oil pressure between each pair of mating surfaces are equal so that there is no resultant end thrust on the rotor and hence no need for a thrust bearing. The free end of the shaft of the rotor is carried through the end housing 73 to avoid disturbing the balance of these forces.

Grooves 76 and 77 are made straight in order to effect a gradual opening of the holes 86, 87 etc. and thus avoid the formation of large pressure waves in pipe 18, Figure 1. With the same object, the leading ends of grooves 76 and 77 may be shallower than the trailing ends and may even merge into the flat surface.

A manually or automatically adjustable timing device 134 of known type as shown in Fig. 10a may be fitted between the rotor shaft and the engine shaft which drives it as shown dotted in Figure 10.

The supply pump for the servo-liquid may be combined with the distributor into a single unit, as shown in Figs 8 and 9 where the shaft 90 is driven from the engine and has formed on it an eccentric 91, provided with a sleeve 92, which drives a hollow pump plunger 93 reciprocating in a bore in the body 94 and containing a return spring 95. Servo-liquid from the tank 119 in Fig. 10 or 139 in Fig. 11 or 169 in Figs. 14 and 15 enters the pump chamber 96 through a lightly spring-loaded valve 97 and is discharged through a spring-loaded valve 98. The discharged liquid at servo-pressure passes through the passage 99 to an accumulator space 100. A diaphragm support piece 101, diaphragm 102, air vessel 103 and charging valve 104 complete the accumulator. From the accumulator space 100, excess liquid can escape through a cross passage 105 to a relief valve of known type (not shown) which is set to maintain the servo pressure at the required value. A passage 106 connects the accumulator space 100 with the recess 107 which houses the distributor rotor 108. This rotor is mounted slidably on a shaft 109 and driven by the key 110. The shaft 109 is arranged to slide inside a bore 111 in the shaft 90, the latter being provided with two internal projections 112 which engage helical splines 113 on the shaft 109. When the shaft 109 is moved in either direction, with or against the pressure of spring 114, the angular position of the distributor rotor is changed in relation to the shaft 90 and thus varies the timing of injection. The distributor may have similar general features as that shown in Figs. 6 and 7 but preferably as described in relation to Fig. 11 in which servo-liquid is delivered from the distributor to the cylinder of the piston 137 (in Fig. 11.)

It is preferred to use a simple plunger type supply pump as described above for a small engine and a gear type pump (121 in Fig. 10, 142 in Fig. 11, 160 in Figs. 14 and 15) for a large engine, but the type of pump is not of great importance to the functioning of the injection system.

The arrangement of the complete fuel injection system is shown diagrammatically in Figure 10 in which 117 is a pipe conveying fuel from the service tank to a filter 118 and thence to an enclosed tank 119. Fuel flows through the pipe 120 to the servo-liquid supply pump 121, which is driven from the engine, and then passes to a pressure regulator 122, controlled by adjusting handle 123, excess fuel above the amount required to maintain the required pressure being discharged via pipe 124 to the tank 119. The remaining fuel flows via filter 125 and manifold 126 to the fuel and servo-liquid inlet connections 5 (Figure 1) of the several pump-injector units. Fuel discharged from connections 24 (Figure 1) of these units flows through manifold 127 to adjustable orifice 128 which may be hand controlled or controlled by an engine governor (in either case a piston-type valve arranged to give a fine variation of discharge area with valve displacement as shown in Fig. 3 may be used) and thence to tank 119.

Pipe 129 conveys fuel at servo-pressure to connection 80 (Figure 6) of the distributor 130 and the fuel discharged from connection 85 (Figure 6) of the distributor returns to the tank 119 via pipe 131. Pipes 132 place connections 88, 89 etc. (Figure 6) of the distributor in communication with the bores 20 (Figure 1) and thus correspond to pipe 18 of Figure 1. Leakage fuel from the several pump-injector units is returned to the tank 119 via manifold 133.

Another embodiment of the invention is shown in Figure 11 in which the admission of the servo-liquid to the cylinder of the piston 137 is controlled not by an individual piston-type valve in each unit, but by a common distribution valve 138. This valve may have the same general features as that shown in Figures 6 and 7, but is provided with larger passages to accommodate the high flow rate of the servo-liquid. In this arrangement it has been found that under certain conditions of speed and load, pressure waves in the pipe between the distributor and the injector unit may interfere with the operation of the unit and may cause secondary injection, in that a low pressure phase may permit additional fuel to enter the pump, while the next high pressure phase may inject this additional fuel into the cylinder. This undesirable effect may be avoided by arranging the feed and discharge ports in the distributor rotor close together, so that the discharge port opens shortly after the feed port closes, and about the end of injection at full load full speed. The cylindrical portion 36, Figure 1, on the inlet valve 25, previously described, decreases the possibility of secondary injection, because a small return movement of the pump plunger 14 does not draw fuel into the bore 15 while the portion 36 is still in its bore. It is advantageous to make the pipes 140, Figure 11, connecting the individual piston cylinders to the distributor, of equal length. Following the pumping stroke in each pump-injector unit, the distributor permits the return of the servo-liquid to the tank 139 via the variable orifice 141 which thus controls the stroke of the pumps. The supply pump 142 feeds a common accumulator 143 via the pressure regulator 144. The manifold 145 supplies fuel at servo system pressure to the individual pumps via pump inlet valves. Another manifold, not shown, conveys leakage fuel back to the tank, as in Figure 10.

The system shown in Figure 11 requires three pipes only for each pump-injector unit, including the pipe for returning leakage fuel back to the tank, whereas the system of Figure 10 requires four. To reduce the number of pipes further to two per unit, the arrangement shown in Figure 12 may be employed. In this, the passage 148, which feeds the pump via the non-return valve 149 is not provided with a separate inlet connection and a separate pipe as in Figure 11, but is connected to the top of the servo-cylinder and hence to the pipe connecting the servo-cylinder to the rotary distributor. A spring 150 is used to return the servo-piston and pump plunger. These latter may be made in one piece as shown, or a separate plunger may be provided with a flange abutting the underside of the piston, the spring bearing on the flange. The spring produces a pressure in the servo-cylinder so that when the distributor permits discharge from the servo-cylinder, a small part of the fuel in this cylinder flows through passage 148 via non-return valve 149 to charge the pump, while the remainder of the amount to be discharged passes through the pipe to the distributor and hence back to the tank via the throttle valve. Figure 12 also shows the nozzle needle valve loaded by applying the liquid pressure directly to the needle itself, an arrangement which avoids the need to provide a passage for the removal of fuel leaking past the stem of the needle valve, and past a separate loading piston. In the arrangement of Figure 12 the leakage passage 151 serves only the space below the servo-piston. The passage 152 is closed by the head of valve 149 except when injection is taking place.

In yet another arrangement illustrated in Figure 13, which is provided with a nozzle having a spring-loaded non-return valve 158 shown in greater detail in Fig. 13a, the servo-cylinder 154 and the pump feed passage 155, are provided with separate pipes, and the chamber below the servo-piston which houses the spring and into which leakage past the pump plunger and past the servo-piston passes, is connected by a short passage 156 to the pump feed passage 155. The servo-cylinder is connected to the distributor as in previously described arrangements and the feed passage 155 is connected to a separate fuel system in which the pressure is much lower than the servo-pressure, e.g. provided by gravity or a low-pressure feed pump. Another feature of the arrangement of Figure 13 is the sealing ring 157 of elastic material used in a groove in the servo-piston to avoid the need of a lapped fit and exact concentricity of the piston and plunger bores.

With this arrangement, the liquid used in the pump operating system need not be fuel, but may be an oil of a type especially suitable for hydraulic systems.

A pump-injector unit of the type shown in Figure 13 may be operated from the lubricating oil system of an engine. Figure 14 shows one such system by way of example. A gear-type pump 160 of sufficient capacity to supply the normal engine requirements and in addition the flow required for the servo system, passes lubricating oil under pressure via a filter 161 to a pressure-limiting relief valve 162, the overflow from which returns to the engine sump. Part of the remainder of the oil passes to the engine lubricating oil gallery 164 via pipe 163, and the rest passes to the accumulator 165 of the servo-system. In this case a piston and spring are used in place of the diaphragm and compressed air chamber used in arrangements described earlier. Leakage past the piston and bulkiness of the spring are less serious defects of this arrangement with the lower pressures used in this system. The oil leaking past the piston is returned to the engine sump. The remainder of the injection system comprises the pump-injector unit 166 which is of the type illustrated in Figure 13, the rotary distributor 167, the output control valve 168 of the variable orifice type as shown in Fig. 3 and a fuel tank 169 and filter 170 supplying fuel to the separate connection of the pump-injector unit. The control valve 168 may be operated manually or by means of a governor in the case of a diesel engine and in conjunction with an air throttle in the case of a spark ignition engine to obtain suitable air/fuel ratios.

In an alternative arrangement shown in Figure 15, the gear-type pump operates at a pressure substantially higher than that required for engine lubrication, and provides a flow sufficient for either the lubrication system or the servo-injection system, according to which requires the greater flow. The servo-system is as described earlier, but the overflow from the pressure relief valve 162 and the discharge from the control valve 168 of the variable orifice type as shown in Fig. 3 are both passed at reduced pressure to the engine lubricating oil gallery 164 which in this case is provided with a relief valve 171 operating at the lower pressure.

In the systems shown in Figures 14 and 15 and particularly in the latter, it is advantageous to use lubricating oil having a low viscosity at atmospheric temperatures and a high viscosity index.

It is to be understood that the above description is by way of example only and that details for carrying the invention into effect may be varied without departing from the scope of the invention.

I claim:

1. Fuel injection system for an internal combustion engine comprising a source of pressure liquid, accumulator means for receiving said liquid under pressure from said source, a liquid pressure operated piston working in a cylinder, fuel injection pump plunger, of smaller diameter than the piston, working in a bore and actuated by said piston, a passage between said accumulator and the end of said piston cylinder remote from the pump plunger, pressure liquid flow control means operated in timed sequence with the cycle of operations of the engine, and controlling flow through said passage, injector means in communication with said injection pump plunger bore, a source of fuel in communication with the said plunger bore by way of a non-return valve, a discharge port in said remote end of the piston cylinder opened and closed by the flow control means, a passageway leading from the port to a zone of low pressure and adjustable means for controlling the discharge of pressure liquid from said end of the piston cylinder by way of said flow control means through the port to the zone of low pressure, said adjustable means comprising an orifice of variable area in said passageway through which the discharged fluid flows at substantially constant pressure during the time said flow control means is open to discharge whereby the return stroke of the said fuel injection pump plunger, and thus the subsequent pumping stroke for the injection of fuel, is controlled.

2. System as claimed in claim 1 in which the pressure liquid flow control means for controlling the flow of pressure liquid through the passage between the accumulator and the piston cylinder, is a distributor driven by the engine and arranged to place the piston cylinder in communication with the source of pressure liquid and a zone of low pressure in timed sequence with the cycle of operations of the engine.

3. System as claimed in claim 1 in which the pressure liquid flow control means for controlling the flow of pressure liquid through the passage between the accumulator and the piston cylinder is an axially movable valve which valve is actuated by pressure liquid controlled by a distributor driven by the engine and which places the valve actuating means in communication with the source of pressure liquid and a zone of low pressure in timed sequence with the cycle of operations of the engine.

4. System as claimed in claim 1 in which the source of pressure liquid is a supply pump of the variable delivery type.

5. System as claimed in claim 1 in which the injection means comprises an injector nozzle with a needle valve and in which a passage for liquid under servo-pressure leads to the end of the needle valve remote from the seat of the valve, the pressure of said liquid providing a force holding the valve closed except when fuel to be injected exerts a greater force in the opposite direction to open the valve.

6. System as claimed in claim 1 in which the injection means comprises an injection nozzle with a needle valve a second cylinder having a piston therein for actuating the needle valve the liquid pressure being applied to the piston in the second cylinder for applying a force to the valve to press it towards its closed position.

7. Fuel injection system for an internal combustion engine having at least one cylinder, comprising a source of pressure liquid accumulator means for receiving said liquid under pressure from said source, a piston working in a cylinder, and operated by said pressure liquid, a fuel injection pump plunger of smaller diameter than the piston, working in a bore, and actuated by said piston, injection means in communication with said injection pump plunger bore, a source of fuel in communication with said plunger bore, a passageway from the end of said cylinder remote from the injection pump for the discharge of pressure liquid, flow control means operated in timed sequence with the cycle of operations of the engine and controlling the supply and discharge of pressure liquid into and out of said remote end of said piston cylinder, and adjustable means comprising an orifice of variable area in the passageway for said discharge of pressure fluid, to a zone of low pressure which in combination with said flow control means regulates the quantity of fuel injected into the cylinder of the engine, by controlling the length of the return stroke and thus of the subsequent pumping stroke of the injection pump plunger, said flow control means controlling the period of time during which said discharge takes place and said orifice of variable area controlling the area through which said discharge takes place.

8. Fuel injection system for an internal combustion engine having at least one cylinder, comprising a source of pressure liquid, accumulator means for receiving said liquid under pressure from said source, a piston working in a cylinder, and operated by said pressure liquid, a fuel injection pump plunger of smaller diameter than the piston, working in a bore, and actuated by said piston, injection means in communication with said injection pump plunger bore, a source of fuel in communication with said plunger bore, a passageway from the end of the cylinder remote from the pump plunger for the discharge of pressure liquid, flow control means operated in timed sequence with the cycle of operations of the engine and controlling the supply of pressure liquid into said piston cylinder to operate said remote end of said piston, and controlling the discharge of pressure liquid at substantially constant pressure through said passageway out of said piston cylinder to a zone of low pressure after the injection of fuel into the cylinder of the engine is completed, and adjustable means comprising an orifice of variable area in the passageway for said discharge of pressure fluid, which in combination with said flow control means regulates the quantity of fuel injected into the cylinder of the engine, by controlling the length of the return stroke and thus of the subsequent pumping stroke of the injection pump plunger, said flow control means controlling the period of time during which said discharge takes place and said orifice of variable area controlling the area through which said discharge takes place.

9. Fuel injection system for an internal combustion engine having at least one cylinder, comprising a source of pressure liquid, accumulator means for receiving said liquid under pressure from said source, said accumulator including a volume of gas confined in a chamber and separated from the pressure liquid by a diaphragm, a piston working in a cylinder, and operated by said pressure liquid, a fuel injection pump plunger of smaller diameter than the piston, working in a bore, and actuated by said piston, injection means in communication with said injection pump plunger bore, a source of fuel in communication with said plunger bore, by way of a non-return valve which in its open position permits the flow of fuel from said source to the injection pump plunger bore, to effect the return stroke of said plunger and supply the fuel for the subsequent pumping stroke, while preventing the flow of fuel to the injector and in its closed position permits the flow of fuel from the plunger bore to the injector while preventing flow back to the said source, a passageway from said cylinder for the discharge of pressure fluid, flow control means operated in timed sequence with the cycle of operations of the engine and controlling the supply of pressure liquid into said piston cylinder to operate said piston, and controlling the discharge of pressure liquid at substantially constant pressure out of said piston cylinder through said passageway to a zone of low pressure after the injection of fuel into the cylinder of the engine is completed, and adjustable means comprising an orifice of variable area in the passageway for said discharge of pressure fluid, which in combination with said flow control means regulates the quantity of fuel injected into the cylinder of the engine, by controlling the length of the return stroke and thus of the subsequent pumping stroke of the injection pump plunger, said flow control means controlling the period of time during which said discharge takes place and said orifice of variable area controlling the area through which said discharge takes place.

References Cited in the file of this patent

UNITED STATES PATENTS

| | | |
|---|---|---|
| 1,816,157 | Scott | July 28, 1931 |
| 1,919,601 | Simmen | July 25, 1933 |
| 1,956,612 | Brun | May 1, 1934 |
| 2,056,204 | Noack | Oct. 6, 1936 |
| 2,598,528 | French | May 27, 1952 |